United States Patent
Honda

[11] Patent Number: 6,076,423
[45] Date of Patent: Jun. 20, 2000

[54] BELLCRANK MECHANISM

[75] Inventor: Keith T. Honda, Ellington, Conn.

[73] Assignee: United Technologies Corporation, Hartford, Conn.

[21] Appl. No.: 09/031,735

[22] Filed: Feb. 27, 1998

[51] Int. Cl.[7] .................................................. F16C 9/00
[52] U.S. Cl. ............................................... 74/519; 74/595
[58] Field of Search ......................... 74/519, 520, 522.5, 74/595, 99 R, 110; 384/276, 275, 144

[56] References Cited

U.S. PATENT DOCUMENTS

| | | | |
|---|---|---|---|
| 3,251,350 | 5/1966 | Thompson | 74/519 X |
| 3,315,537 | 4/1967 | Keller | 74/519 |
| 3,712,278 | 1/1973 | Kuhn | 74/519 X |
| 4,827,713 | 5/1989 | Peterson et al. | 60/226.1 |
| 4,878,767 | 11/1989 | Halder | 384/275 X |
| 5,433,178 | 7/1995 | Urmaza | 74/519 X |

Primary Examiner—Mary Ann Battista
Attorney, Agent, or Firm—Kenneth C. Baran

[57] ABSTRACT

A bellcrank mechanism (52) for applications in which unequal transverse forces ($F_i$, $F_o$) act on the two legs of a bellcrank support clevis includes a bellcrank bracket (64), a bellcrank (54) having a support clevis (56), and a set of bearings (84a, 84b) having unequal load bearing areas (99a, 99b). The bearings are installed in apertures (80) in the support clevis and are axially clamped to the support bracket to pivotably and transversely support the bellcrank so that relative pivotal motion occurs at the interface (102a, 102b) between the exterior surface (99a, 99b) of each bearing and the perimeter surface (100a, 100b) of the corresponding clevis aperture (80). The bearing having the larger load bearing area is aligned with the larger transverse force and the bearing with the smaller load bearing area is aligned with the smaller transverse force to improve the durability and reliability of the bellcrank mechanism. In one variant, each bearing is circumscribed by a similarly sized wear sleeve (82a, 82b) so that relative motion occurs at the interface (96a, 96b) between the interior surface (97a, 97b) of each wear sleeve and the exterior surface 99a, 99b of the corresponding bearing 84a, 84b. In another embodiment, each bearing includes a flange (85) that seats against the bellcrank (54) to guard against dirt contamination of the relative motion interfaces.

8 Claims, 4 Drawing Sheets

BELLCRANK MECHANISM

CROSS REFERENCE TO RELATED APPLICATIONS

This application contains subject matter related to commonly owned copending patent application entitled "Valve Seal Assembly", filed concurrently herewith.

TECHNICAL FIELD

This invention pertains to bellcrank mechanisms for transferring the output of an actuator to a component requiring actuation, and particularly to an improved reliability bellcrank mechanism for transferring the output of a linear actuator to a valve ring for diverting pressurized fluid from a flowpath in a gas turbine engine.

BACKGROUND OF THE INVENTION

Gas turbine engines include one or more compressors for pressurizing a working medium fluid, typically ambient air, that flows through an axially extending compressor flowpath. Under some operating conditions, it is desirable to temporarily moderate the pressure at the discharge end of the compressor to prevent or recover from compressor stall or other aerodynamic instabilities. Pressure moderation is usually effected by opening a valve that diverts a portion of the pressurized fluid from the discharge end of the compressor flowpath into a lower pressure region.

An exemplary compressor valve is described in U.S. Pat. No. 4,827,713, which is assigned to the assignee of the present application, and whose contents are incorporated herein by reference. The disclosed valve includes a stationary orifice ring having a series of circumferentially distributed passages joining the compressor flowpath to a surrounding annulus, and a valve ring for regulating fluid flow through the passages. A bellcrank mechanism for operating the valve ring is mounted on a mechanically grounded bellcrank support bracket by a bellcrank pivot. The bellcrank pivot, whose details are not illustrated in the reference, comprises a pivot pin that connects a clevis portion of the bellcrank to the bracket. The pivot pin has a cylindrical shank extending through apertures in the clevis and through a corresponding bore in the bracket. A pair of equally sized bushings circumscribes the pin and lines the bore. Input and output arms of the bellcrank are connected respectively to an actuator (not illustrated in the reference) and to the valve ring. The bellcrank arms are axially offset from the axial midplane of the clevis due to space constraints not evident in the reference.

In operation, the actuator rotates the bellcrank mechanism about the bellcrank pivot so that the bellcrank, in turn, drives the valve ring in a spiral motion to cover or uncover the passages. The pin rotates in unison with the bellcrank so that, ideally, relative motion occurs at the interface between the interior surface of each bushing and the exterior, cylindrical surface of the pivot pin. The pivot also reacts the transverse forces exerted by the actuator, and by the mechanical resistance of the valve ring, to transversely support the bellcrank in the bracket. Because the bellcrank arms are offset from the axial midpoint of the pivot, the transverse forces are apportioned unequally between the bushings so that a larger transverse load is exerted on the bushing more closely aligned with the bellcrank arms and a smaller transverse load is exerted on the other bushing. The larger load exerted on the aligned bushing results in a proportionately larger frictional force resisting rotation of the pin and the bellcrank. The larger frictional force can cause locally accelerated wear of the pin and can eventually cause the pin to seize in the bushing or to fracture, effectively disabling the valve or at least degrading its response to the actuator. The above described problem can be addressed by frequently inspecting the support pin for signs of excessive wear and incipient seizure. However the bellcrank mechanism is not readily accessible in a fully assembled engine, and so pin inspection is both time consuming and expensive and therefore is a highly unsatisfactory solution to the problem.

In view of the above described shortcomings an increased reliability, high durability bellcrank mechanism is sought.

SUMMARY OF THE INVENTION

According to the invention an improved bellcrank mechanism subject to unequal transverse forces includes a bellcrank bracket, a bellcrank having a support clevis, and a set of bearings having unequal load bearing areas. The bearings are installed in apertures in the support clevis and are anchored to the support bracket to pivotably and transversely support the bellcrank so that relative pivotal motion occurs at the interface between the exterior surface of each bearing and the perimeter surface of the corresponding clevis aperture. The bearing having the larger load bearing area is aligned with the larger transverse force and the bearing with the smaller load bearing area is aligned with the smaller transverse force to improve the durability and reliability of the bellcrank mechanism. In one variant of the invention, each bearing is circumscribed by a similarly sized wear sleeve so that relative motion occurs at the interface between the interior surface of each wear sleeve and the exterior surface of the corresponding bearing. In another embodiment of the invention, each bearing includes a flange that seats against the bellcrank to guard against dirt contamination of the relative motion interfaces.

The primary advantage of the invention is the improved durability and reliability of the bellcrank mechanism. An additional advantage is that the bearings and wear sleeves are inexpensive and easily replaceable.

The foregoing features and advantages and the operation of the invention will become more apparent in light of the following description of the best mode for carrying out the invention and the accompanying drawings.

BEST MODE FOR CARRYING OUT THE INVENTION

Figure 1:
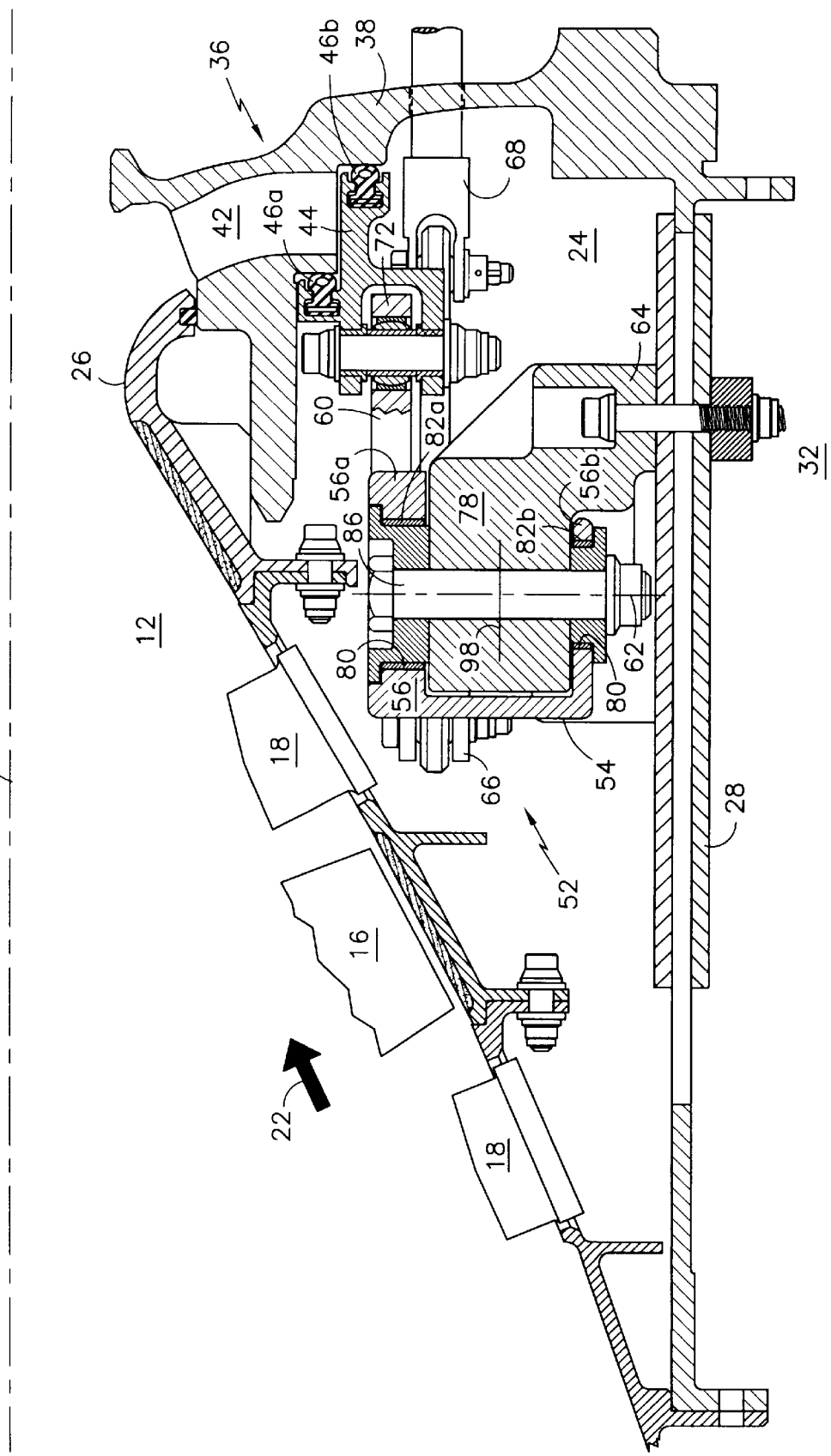
FIG. 1 is a side view illustrating the bellcrank mechanism of the present invention as installed in a turbine engine for operating a compressor valve.
Figure 2:
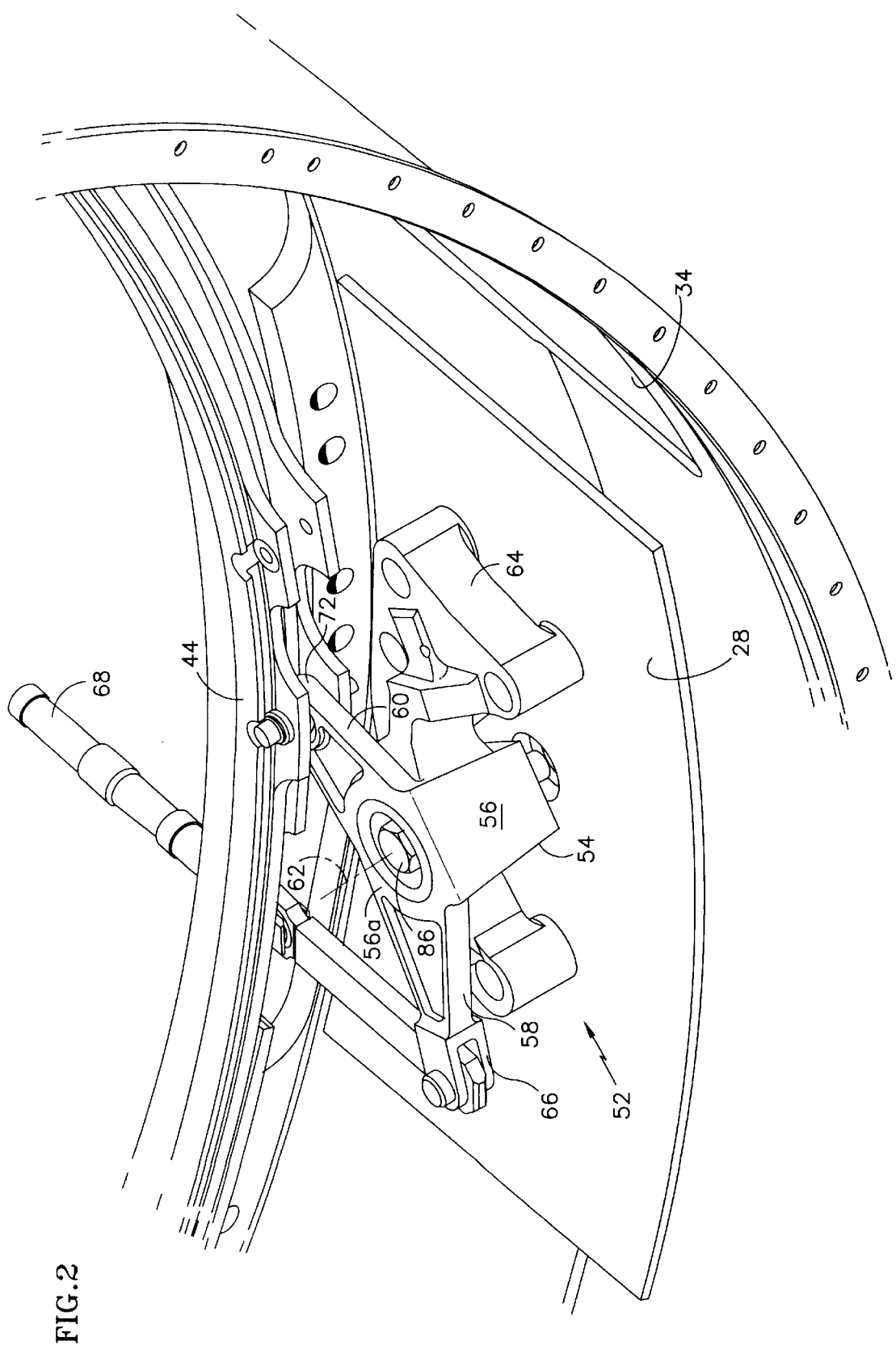
FIG. 2 is a perspective view illustrating the bellcrank mechanism of the present invention as installed in a turbine engine for operating a compressor valve.

This invention is predicated in part on the recognition that the reliability of a bellcrank mechanism is adversely affected by input and output forces that are axially offset from the midpoint of the bellcrank clevis, and that bellcrank reliability can be improved by appropriate use of bearings having dissimilar load bearing areas FIGS. 1 and 2 illustrate a portion of the discharge end of an axial flow compressor for a turbofan gas turbine engine. The compressor has an annular flowpath 12 disposed about a longitudinally extending compressor centerline 14. Multiple rows of rotatable blades 16 and nonrotatable vanes 18 extend across the flowpath for compressing a working medium fluid 22 that flows longitudinally through the flowpath. An annular cavity 24, radially bounded by a compressor case 26 and a support frame 28 circumscribes the compressor flowpath. A secondary flowpath 32 circumscribes the cavity 24 and communicates therewith by way of permanent openings 34 in the frame.

The compressor also includes a valve 36 for diverting pressurized fluid out of the compressor flowpath and into the secondary flowpath 32 by way of the cavity 24. The valve includes a stationary orifice ring 38 with a series of passages 42 joining the compressor flowpath to the cavity. The valve also includes a moveable valve ring 44. The valve ring is longitudinally positionable between a fully closed position and a fully open position to regulate fluid flow through the passages 42. With the valve ring in the illustrated, fully closed position, a pair of circumferentially extending resilient seals 46a, 46b are compressed against the orifice ring to inhibit fluid leakage out of the compressor flowpath.

An actuation system for positioning the valve ring 44 includes a bellcrank mechanism 52. The bellcrank mechanism comprises a bellcrank 54 having a support clevis 56 with input and output arms 58, 60 radiating therefrom. As described more completely hereinafter, the bellcrank is pivotably supported for rotation about a bellcrank axis 62 by a bellcrank bracket 64 bolted or otherwise mechanically grounded to the support frame 28. Distal end 66 of the input arm 58 is connected to one end of a pushrod assembly 68. The other end of the pushrod assembly is connected to a linear actuator, not shown. Distal end 72 of the output arm 60 is connected to the valve ring 44. In operation, linear translation of the pushrod assembly rotates the bellcrank 54 about the bellcrank axis 62. The bellcrank, in turn, drives the valve ring in a spiral motion, as described in reference U.S. Pat. No. 4,827,713, to cover or uncover the passages 42.

Figure 3:
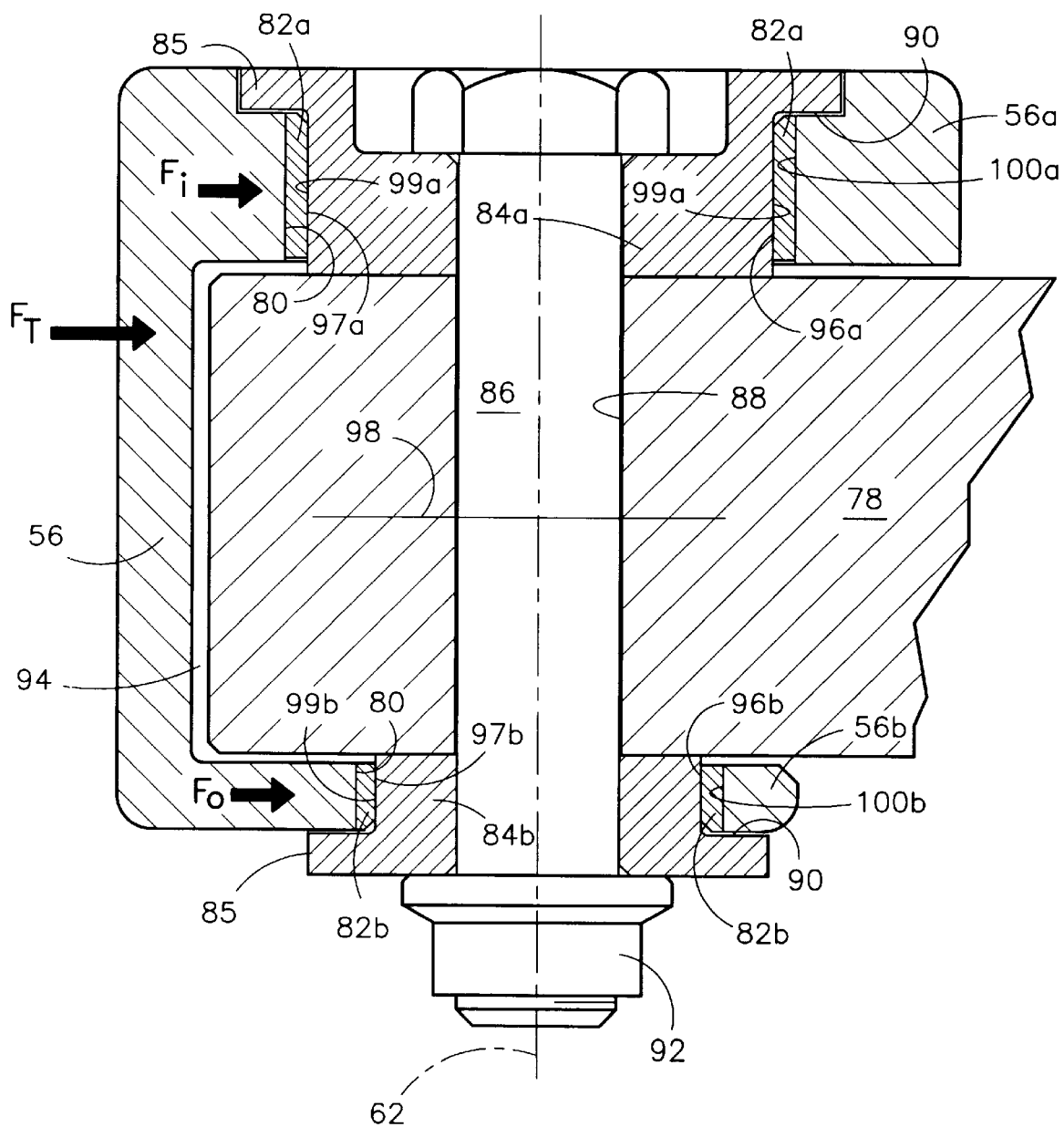
FIG. 3 is an enlarged side view similar to FIG. 1 illustrating an arrangement for pivotably mounting a bellcrank on a bellcrank support bracket.

As seen best in FIG. 3, the bellcrank support clevis 56 has inner and outer legs 56a, 56b that embrace a tongue 78 of the support bracket. Each leg has an aperture 80 extending therethrough. Cylindrical wear sleeves 82a, 82b are press fit into each aperture to line the interior perimeter surfaces 100a, 100b thereof Journal bearings 84a, 84b, each having a flange 85, are installed in the aperture so that the wear sleeves 82a, 82b circumscribe the respective bearings 84a, 84b, and the flange seats lightly against the bellcrank clevis 56. The exterior surfaces 99a, 99b of each bearing and the adjacent underside 90 of each flange 85 are coated with a low friction coating. The bearings are anchored to the bracket 64 so that the bearings do not rotate, about axis 62, relative to the bracket. In the illustrated embodiment, the bearings are anchored to the bracket by being axially clamped thereto. Specifically, a fastener, such as bolt 86 extends through the bearings and through a bore 88 in the bracket tongue 78. A nut 92 cooperates with the bolt to axially clamp the bearings to the bracket so that the bellcrank is pivotably supported on the bracket and spaced from the bracket tongue by a small clearance gap 94. Because the bearings are axially clamped to the bracket and the wear sleeves 82a, 82b are press fit into apertures 80, relative rotary motion occurs at the interface 96a, 96b between the exterior surface 99a, 99b of each bearing and the interior surface 97a, 97b of the corresponding wear sleeve 82a, 82b. Dirt infiltration into the relative motion interface is resisted by the bearing flanges 85, which are seated lightly on the clevis arms 56a, 56b to form a contaminant resistant barrier. Each wear sleeve has a load bearing area, which is the area of the cylindrical interior surface 97a, 97b of the wear sleeve in contact with the cylindrical exterior surface 99a, 99b of the bearing at the relative motion interfaces 96a, 96b. Similarly, each bearing also has a load bearing area which is the area of the cylindrical exterior surface 99a, 99b of the bearing in contact with the cylindrical interior surfaces 97a, 97b of the wear sleeve at the relative motion interfaces 96a, 96b. Thus, the relative motion interface is also a load bearing interface.

The bearings, wear sleeve and bolt also support the bellcrank transversely (perpendicular to the bellcrank axis) in the bracket by reacting the transversely directed forces $F_T$ exerted by the actuator and by the mechanical resistance of the valve ring. Ideally, the bellcrank mechanism would be configured with the input and output arms 58, 60 axially aligned with the axial midplane 98 of the clevis. With such a configuration, the transverse forces exerted on the wear sleeves would be approximately equal. However due to space constraints, the arms 58, 60 are axially offset from the midplane and instead are approximately axially aligned with the inner clevis leg 56a. As a result, the magnitude of the transverse force $F_i$ acting on the inner wear sleeve 82a and inner bearing 84a is substantially greater than the magnitude of the force $F_o$ acting on the outer wear sleeve 82b and outer bearing 84b. Accordingly, the load bearing areas of the inner wear sleeve and of the inner bearing are made correspondingly larger than the load bearing areas of the outer wear sleeve and of the outer bearing. Preferably, the inner and outer load bearing areas are approximately proportional to the inner and outer forces $F_i$, $F_o$. Because the larger force is distributed over a correspondingly larger load bearing area, the force per unit area (bearing stress) remains modest despite the presence of the larger force. As a result, wear at interface 96a (i.e. the wear on surfaces 97a and 99a) is limited, as is the likelihood that the bearing will seize and disable the valve or interfere with its smooth operation.

Figure 4:
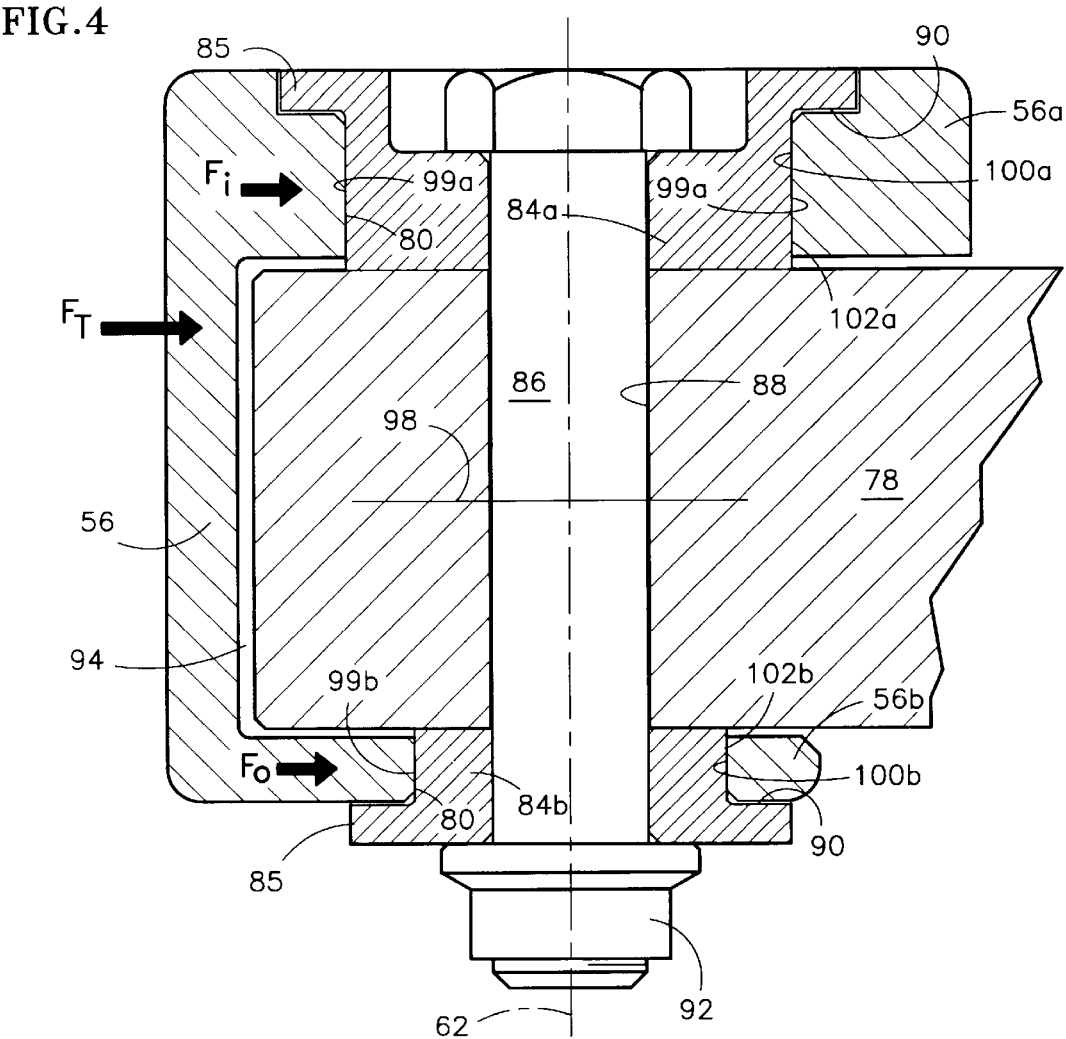
FIG. 4 is a side view similar to FIG. 3 illustrating an alternative arrangement.

In an alternative arrangement seen in FIG. 4, the wear sleeve is absent and relative rotary motion occurs at the interface 102a, 102b between the perimeter surface 100a, 100b of each clevis aperture and the exterior surface 99a, 99b of the corresponding bearing 84a, 84b. Dirt infiltration into the relative motion interface is resisted by the bearing flanges, which are seated lightly on the clevis arms 56a, 56b to form a contaminant resistant barrier. Each bearing has a load bearing area, which is the area of the cylindrical exterior surface 99a, 99b of the bearing in contact with the perimeter surface 100a, 100b of the clevis apertures at the relative motion interfaces 102a, 102b. Thus, the relative motion interface is also a load bearing interface. Because of the unequal transverse forces at each bearing, the load bearing area of the inner bearing 84a is made correspondingly larger than the load bearing area of the outer bearing 84b. Preferably, the inner and outer load bearing areas are approximately proportional to the inner and outer forces $F_i$, $F_o$ exerted on the bearings. Because the larger force is distributed over a correspondingly larger load bearing area, the force per unit area (bearing stress) remains modest despite the presence of the larger force. As a result, wear at the interface 102a (i.e. the wear of bearing surface 99a and aperture surface 100a) is limited, as is the likelihood that the bearing will seize and disable the valve or interfere with its smooth operation. Although this alternative configuration is satisfactory, the embodiment that includes the wear sleeves (FIG. 3) is preferred since the wear sleeves are inexpensive and easily replaceable if the low friction coating becomes worn and ineffective. The wear sleeves also make the selection of a bellcrank material independent of wear considerations.

Figure 5:
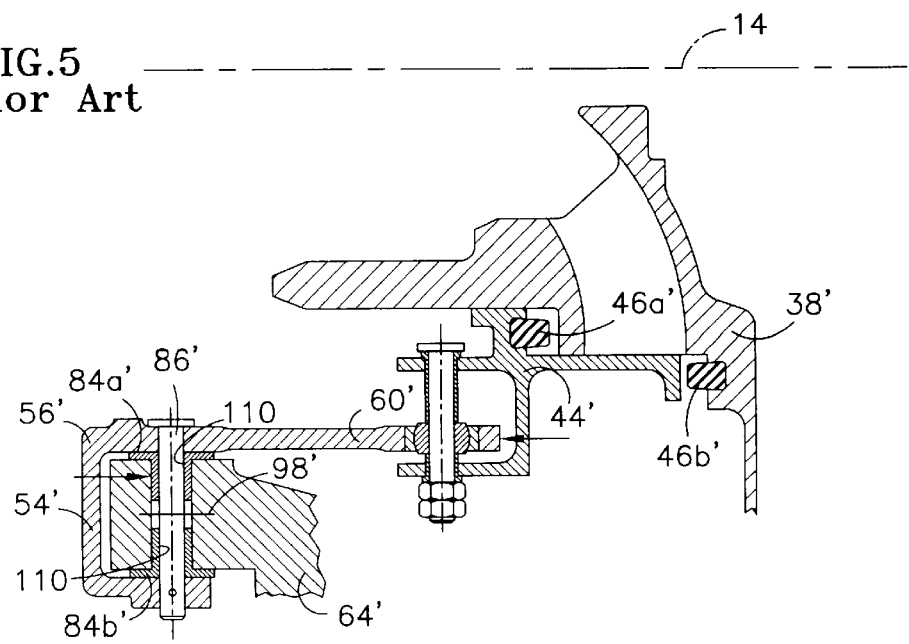
FIG. 5 is a side view of a prior art bellcrank mechanism.

The invention can now be contrasted with a prior art bellcrank mechanism shown in FIG. 5. The Figure illustrates a compressor valve comprising a stationary orifice ring 38' and a moveable valve ring 44'. Sealing rings 46a', 46b' are affixed to the valve ring and orifice ring respectively. A bellcrank 54' for operating the valve ring is mounted on a support bracket 64' by a bellcrank pivot. The bellcrank pivot comprises a pivot pin 86' secured to bellcrank clevis 56' for connecting the bellcrank clevis to the bracket. The pivot pin has a cylindrical shank extending through apertures in the clevis and through a corresponding bore in the bracket. A pair of equally sized bushings 84a', 84b' circumscribe the pin and line the bore. The bellcrank input arm (not visible) and output arm 60' are axially offset from the axial midplane 98' of the clevis.

In operation, an actuator (not shown) rotates the bellcrank about the bellcrank pivot to drive the valve ring 44'. The pin rotates in unison with the bellcrank so that, ideally, relative motion occurs at the interface 10 between the interior surface of the bushings and the exterior, cylindrical surface of the pivot pin. Because the bellcrank arms are offset from the axial midplane of the clevis, the inner bushing 84a' is subjected to the greater transverse load. This greater transverse load causes increased frictional resistance to rotation of the pin. Since the bushings are of equal size, this greater load is not distributed over a correspondingly larger area, and so the pin begins to wear excessively and can resist rotating in the bushing so that the clevis rotates about the pin. However, the load bearing area between the pin and the clevis is limited and therefore excessive wear occurs at the interface between the pin and the clevis. In the extreme, the worn pin can seize in the bushing or can fracture.

The invention is not limited to the above described embodiment. For example, although simple journal bearings are illustrated and described, other types of bearings, such as roller bearings may also be used. Moreover, the invention is useful for any bellcrank whose input and output arms are situated so that unequal forces act on the bearings, and is not restricted to the illustrated arrangement in which the unequal forces arise from axial alignment of both arms with one of the clevis legs. Means other than the illustrated nut and bolt may be used to anchor the bearings to the bracket so that the bearings do not rotate (or translate axially) relative to the bracket. For example, the bearings may be pinned to the bracket. These and other changes, modifications and adaptations can be made without departing from the invention as set forth in the accompanying claims.

I claim:

1. A bellcrank mechanism, comprising;

a bellcrank bracket grounded to a support frame; and a bellcrank having input and output arms radiating from a support clevis, the support clevis having inner and outer legs, each leg having an aperture with a bearing installed therein for pivotably supporting the bellcrank from the bracket and wherein during operation of the bellcrank a first transverse force is conveyed from the bellcrank to one of the bearings and a second transverse force, smaller than the first transverse force, is conveyed to the other of the bearings, the bearing subject to the first force having a first load bearing area, the bearing subject to the second force having a second load bearing area, and wherein the first load bearing area is larger than the second load bearing area.

2. The bellcrank mechanism of claim 1 wherein a wear sleeve circumscribes each of the bearings, one of the wear sleeves and its associated bearing is subject to the first force and the other of the wear sleeves and its associated bearing is subject to the second force, the wear sleeve subject to the first force having a first wear sleeve load bearing area and the wear sleeve subject to the second force having a second wear sleeve load bearing area, the first wear sleeve load bearing area being larger than the second wear sleeve load bearing area.

3. The bellcrank mechanism of claim 1 or 2 wherein each load bearing area is approximately proportional to the respective transverse force.

4. The bellcrank mechanism of claim 2 wherein relative pivotal motion occurs at an interface between each clevis aperture and the respective wear sleeve.

5. The bellcrank mechanism of claim 1 wherein each bearing has a flange that seats lightly against the bellcrank to form a contaminant resistant barrier.

6. The bellcrank mechanism of claim 1 wherein the bearings are anchored to the bracket by being axially clamped thereto.

7. The bellcrank mechanism of claim 1 wherein relative pivotal motion occurs at an interface between each clevis aperture and the respective bearing.

8. The bellcrank mechanism of claim 1 wherein each bearing is a journal bearing.

\* \* \* \* \*